United States Patent
Toujima et al.

(10) Patent No.: US 7,053,513 B2
(45) Date of Patent: May 30, 2006

(54) MAGNETIC CIRCUIT STRUCTURE FOR ROTARY ELECTRIC MACHINE

(75) Inventors: Hisaaki Toujima, Yokohama (JP); Minoru Arimitsu, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/959,581

(22) Filed: Oct. 7, 2004

(65) Prior Publication Data

US 2005/0077802 A1  Apr. 14, 2005

(30) Foreign Application Priority Data

Oct. 10, 2003 (JP) .............................. 2003-352629

(51) Int. Cl.
*H02K 16/00* (2006.01)
(52) U.S. Cl. ................... 310/114; 310/266; 310/156.57
(58) Field of Classification Search ........ 310/112–113, 310/266, 156.36, 156.37, 156.53, 156.56, 310/156.57
See application file for complete search history.

(56) References Cited

U.S. PATENT DOCUMENTS 6,008,559 A  12/1999 Asano et al. ............... 310/156
6,445,100 B1 *  9/2002 Tajima et al. ........... 310/156.57
6,525,442 B1 *  2/2003 Koharagi et al. ...... 310/156.48
6,590,312 B1 *  7/2003 Seguchi et al. ............. 310/266
6,838,790 B1 *  1/2005 Arimitsu et al. .............. 310/43
6,864,604 B1 *  3/2005 Nakano et al. ................ 310/57
2002/0112904 A1  8/2002 Matsunobu et al. ........ 180/65.2
2003/0102757 A1  6/2003 Tajima et al. ........... 310/156.52

FOREIGN PATENT DOCUMENTS

| DE | 102 19 332 A1 | 12/2002 |
|---|---|---|
| EP | 0 680 131 A2 | 11/1995 |
| JP | 2000-224836 A | 8/2000 |
| JP | 2001-103717 A | 4/2001 |
| JP | 2003-032924 A | 1/2003 |
| WO | WO 03/084028 A1 | 10/2003 |
| WO | WO 03/084029 | * 10/2003 |
| WO | WO 03/084032 A1 | 10/2003 |

* cited by examiner

*Primary Examiner*—Dang Le
(74) *Attorney, Agent, or Firm*—Foley & Lardner LLP

(57) ABSTRACT

A rotary electric machine includes inner and outer rotors each including permanent magnets, and a stator including stator coils, disposed between the inner and outer rotors. The inner rotor further includes outer surface portions serving as a yoke portion of an outer magnetic circuit for magnetic flux synchronous with the outer rotor, and the outer rotor further includes outer portions each located on an outer side of one of the outer permanent magnet, and arranged to serve as a yoke portion of an inner magnetic circuit for magnetic flux synchronous with the inner rotor.

14 Claims, 9 Drawing Sheets

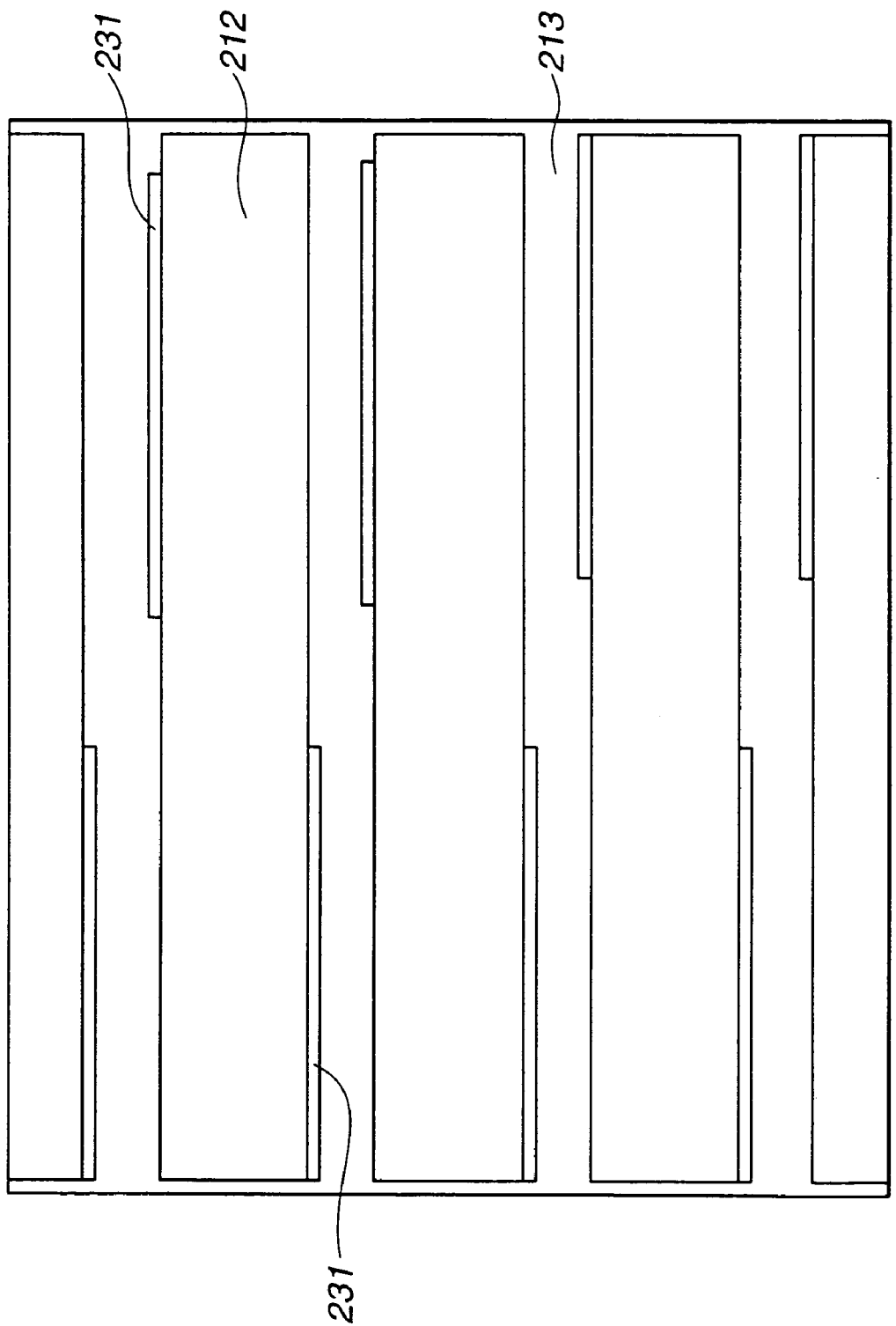

MAGNETIC CIRCUIT STRUCTURE FOR ROTARY ELECTRIC MACHINE

BACKGROUND OF THE INVENTION

The present invention relates to a magnetic circuit structure for a rotary electric machine, and more specifically to a magnetic circuit structure for a rotary electric machine including an outer rotor including a plurality of outer permanent magnets arranged circumferentially, an inner rotor including a plurality of inner permanent magnets arranged circumferentially at a predetermined angle with respect to a radial direction alternately in opposite directions, and a stator disposed between the inner and outer rotors.

Publish Japanese Patent Application, KOKAI Nos. 2000-224836 and 2001-103717 show motors of a multi-shaft, multi-layer type including an outer rotor including a plurality of outer permanent magnets arranged circumferentially, an inner rotor including a plurality of inner permanent magnets arranged circumferentially at a predetermined angle with respect to a radial direction alternately in opposite directions, and a stator disposed between the inner and outer rotors.

SUMMARY OF THE INVENTION

In such a multi-shaft, multi-layer rotary electric machine, the magnetic reluctance is high in a yoke serving as a path for flux generated by inner or outer permanent magnets or generated by stator coils or armature coils wound on stator teeth of a stator in synchronism with the outer or inner rotor because the separation among the inner or outer permanent magnets is short. Therefore, the magnetic circuit structure of this type requires a large quantity of magnet to achieve sufficient torque, i.e., sufficient magnetic flux.

Therefore, the multi-shaft, multi-layer rotary electric machine of this type is disadvantageous in cost, and inadequate to achieve high rotor speeds. Moreover, the magnetic reluctance of q-axis magnetic circuit is relatively high because of shorter separation among magnets, and hence it is difficult to make effective use of reluctance torque.

It is therefore an object of the present invention to provide a rotary electric machine aimed to solve the above mentioned problem, and arranged to achieve higher magnetic flux, and higher rotor speeds at low cost, and to use reluctance torque effectively.

According to one aspect of the present invention, a rotary electric machine comprises: a stator including a plurality of stator coils arranged around a center axis of the rotary electric machine; an inner rotor disposed rotatably inside the stator, and an outer rotor disposed rotatably outside the stator. The inner rotor includes a plurality of inner permanent magnets arranged around the center axis and inclined alternately, and a plurality of outer surface portions serving as a yoke portion of an outer magnetic circuit. The outer rotor includes a plurality of outer permanent magnets arranged in a circle, and a plurality of outer portions each located on an outer side of one of the outer permanent magnet, and arranged to serve as a yoke portion of an inner magnetic circuit for magnetic flux synchronous with the inner rotor whereas each outer surface portion of the inner rotor is arranged to serve as the yoke portion of the outer magnetic circuit for magnetic flux synchronous with the outer rotor. The inner magnetic circuit is arranged to serve further as a quadrature axis magnetic circuit of the outer rotor, and the outer magnetic circuit is arranged to serve further as a quadrature axis magnetic circuit of the inner rotor.

According to another aspect of the invention, a rotary electric machine comprises: a stator including a plurality of stator teeth and a plurality of stator coils; an outer rotor disposed rotatably outside the stator, the outer rotor including an outer annular member, and a plurality of outer permanent magnets arranged in the outer annular member so that inner portions are formed in the outer annular member and that the inner portions of the outer annular member and the outer permanent magnets are arranged alternately in a circle; and an inner rotor disposed rotatably inside the stator, the inner rotor including an inner annular member, and a plurality of inner permanent magnets arranged in a circle in the inner annular member, and inclined alternately so that wider portions and narrower portions are formed alternately in an outer circumference of the inner annular member by the inner permanent magnets. A circumferential length of the inner portions of the outer annular member is greater than or substantially equal to a minimum circumferential width of the stator teeth, and a circumferential length of the wider portions of the inner annular member is greater than or substantially equal to a double of the circumferential length of the inner portions of the outer annular member.

BRIEF DESCRIPTION OF THE DRAWINGS

FIG. 8 is a view showing an outer rotor 211 of the rotary electric machine of FIG. 7, as viewed from a stator air gap 215.

DETAILED DESCRIPTION OF THE INVENTION

Figure 1:
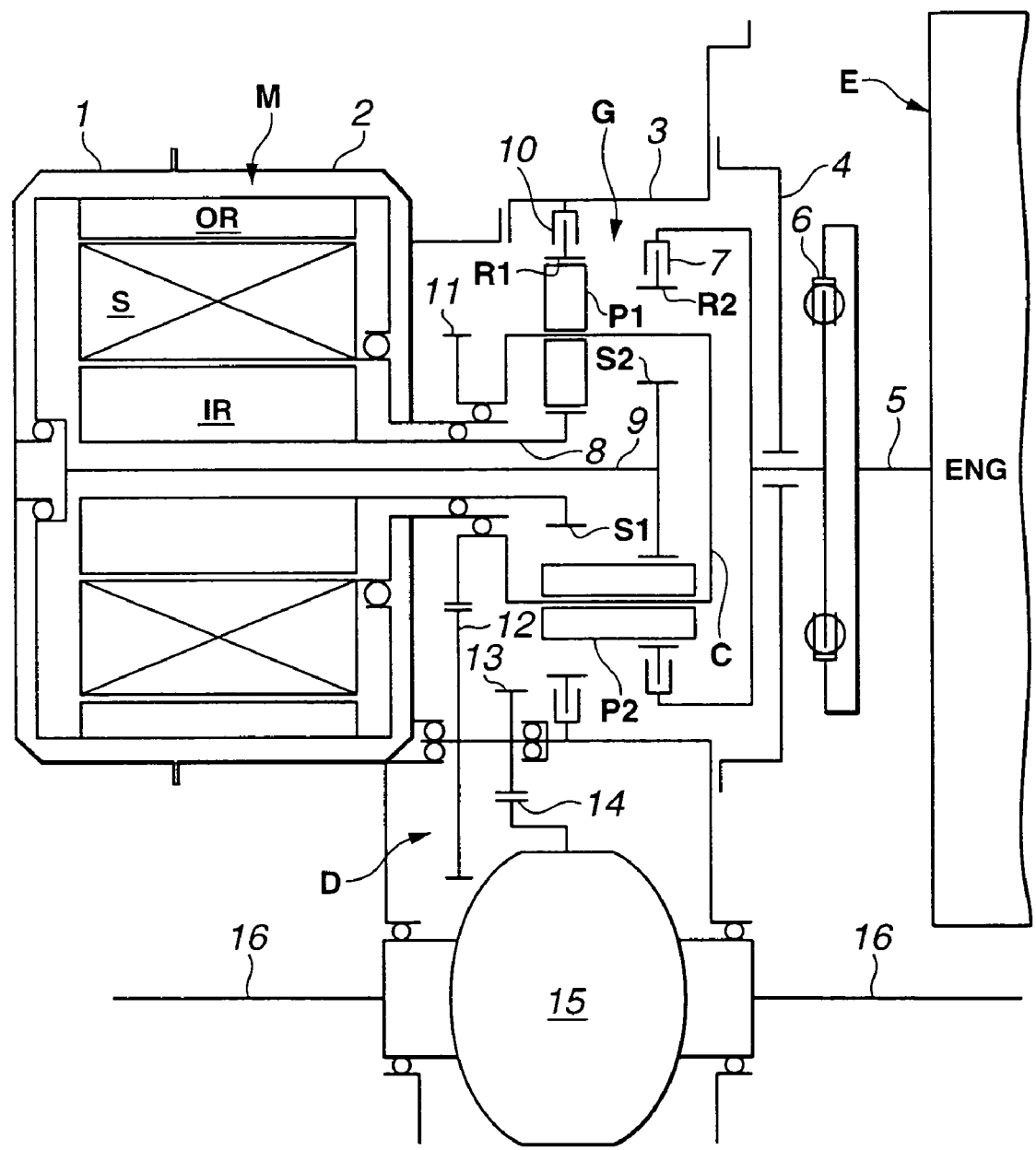
FIG. 1 is a schematic view showing a hybrid drive system including a multi-shaft, multi-layer motor according to a first embodiment of the present invention.

FIG. 1 shows a hybrid drive system or unit including a multi-shaft, multi-layer motor M having a magnetic circuit structure according to the first embodiment. The hybrid drive unit of FIG. 1 includes an engine E, multi-shaft, multi-layer motor M, a Ravigneaux type compound planetary gear train G, and a drive output mechanism D. As shown in FIG. 1, this system further includes a motor cover 1, a motor case 2, a gear housing 3, and a front cover 4. In this example, the hybrid drive system is used as a prime mover of a vehicle.

Engine E is a primary power source in the hybrid drive system of this example. An engine output shaft 5 of engine E is connected with a second ring gear R2 of Ravigneaux compound planetary gear set G, through a damper system 6 for absorbing rotational fluctuation, and a multiple disk clutch 7.

Multi-shaft, multi-layer motor M is a secondary power source in the hybrid system of this example. Despite its appearance like a single motor unit, multi-shaft, multi-layer motor M can function as two motor/generators. Multi-shaft, multi-layer motor M of this example includes a stator S, an inner rotor IR surrounded coaxially by stator S, and an outer rotor OR surrounding stator S coaxially. Thus, multi-shaft, multi-layer motor M of this example has a coaxial three-layer structure. Stator S is fixed to motor case 2, and provided with coils. Stator S serves as a stationary armature. Inner rotor IR includes permanent magnets embedded therein. Outer rotor OR includes permanent magnets embedded therein.

A first motor hollow shaft 8 fixed with inner rotor IR is connected to a first sun gear S1 of Ravigneaux compound planetary gear train G. A second motor shaft 9 fixed with outer rotor OR is connected to a second sun gear S2 of Ravigneaux compound planetary gear train G.

Ravigneaux compound planetary gear train G is a planetary gear system which can vary the speed ratio continuously in a stepless manner by controlling the two motor speeds of multi-shaft, multi-layer motor M. Common planet carrier C supports first pinions P1 and second pinions P2 each engaging with one of first pinions P1. Ravigneaux compound planetary gear train G of this example has the following five active rotary elements: common carrier C; first sun gear S1 engaging with first pinions P1; second sun gear S2 engaging with second pinions P2; a first ring gear R1 engaging with first pinions P1; and a second ring gear R2 engaging with second pinions P2. A multiple disk brake 10 is connected between first ring gear R1 and gear housing 3. Common carrier C is connected with an output gear 11.

Drive output mechanism D includes output gear 11 connected with common carrier C, a first counter gear 12, a second counter gear 13, a drive gear 14, a differential 15, and drive shafts 16. Output torque is transmitted from output gear 11, through first counter gear 12→second counter gear 13→drive gear 14→differential 15, and further transmitted through drive shafts 16 to drive wheels of the vehicle.

In this hybrid drive system, second ring gear R2 is connected with engine output shaft 5; first sun gear S1 is connected with first motor hollow shaft 8; second sun gear S2 is connected with second motor shaft 9; and common carrier C is connected with output gear 11.

Figure 2:
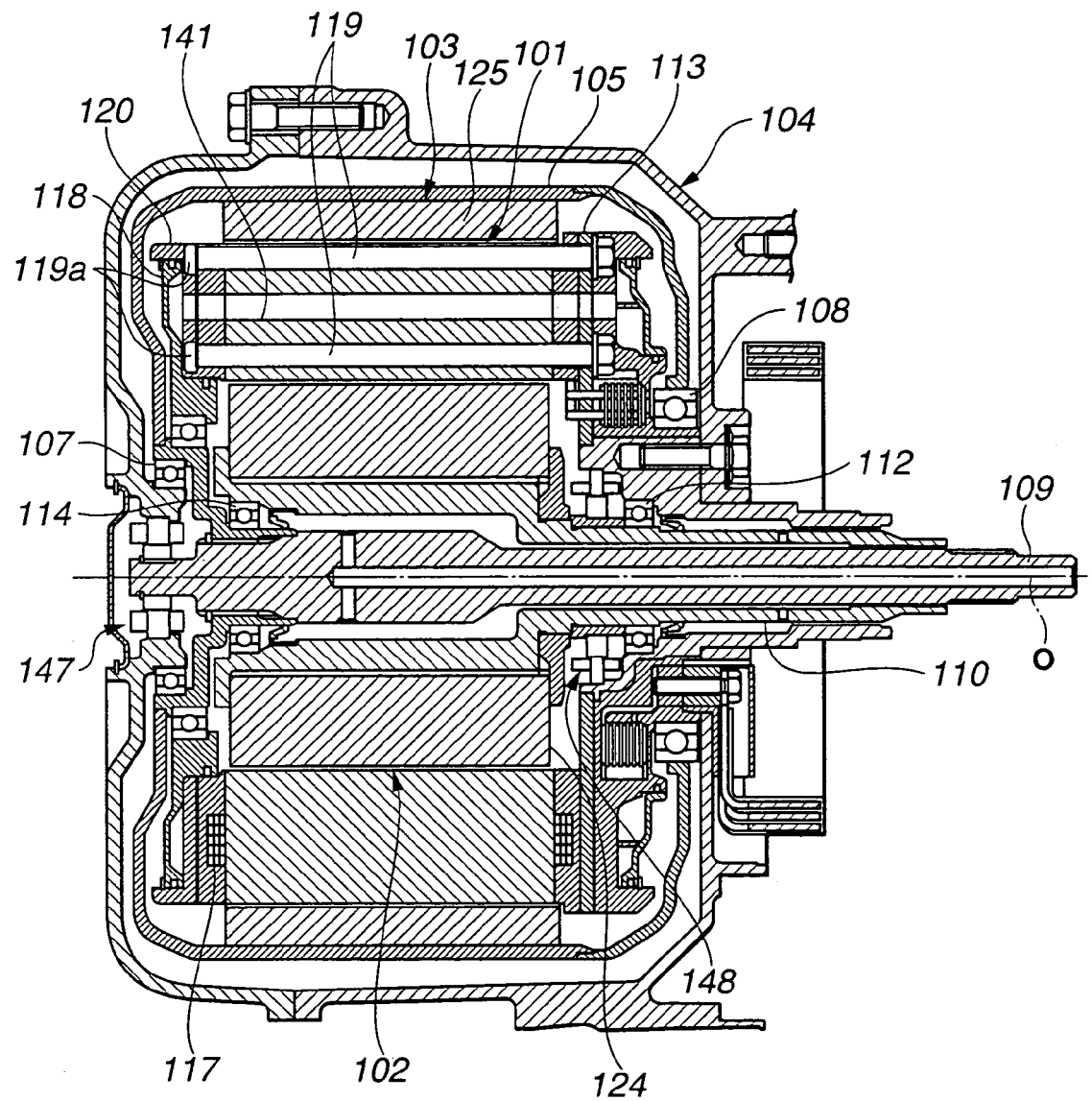
FIG. 2 is a vertical sectional view showing the multi-shaft, multi-layer motor according to the first embodiment.

FIG. 2 shows the structure of multi-shaft, multi-layer motor M which can be employed in the embodiment. This multi-shaft, multi-layer motor M constitutes a hybrid transmission for a vehicle with Ravigneaux type compound planetary gear train G. A laminated core structure according to the embodiment of this invention is applicable to this multi-shaft, multi-layer motor M. Multi-shaft, multi-layer motor M, as shown in FIG. 2, includes an annular stator 101, an inner rotor 102 disposed rotatably on a radial inner side of stator 101 so as to be surrounded coaxially by stator S, and an outer rotor 103 disposed rotatably on a radial outer side of stator 101 so as to surround stator S coaxially. Inner and outer rotors 102 and 103 are rotatable about a center rotation axis O. Stator 101 and inner and outer rotors 102 and 103 form a three-layered structure, which is housed in a housing 104.

In this example, each of inner rotor 102 and outer rotor 103 includes a laminated core (or annular member) 124 or 125 of magnetic steel sheets formed by press forming, and laminated in an axial direction; and permanent magnets arranged at regular intervals in a circumferential direction in laminated core 124 or 125 so that each permanent magnet extends through laminated core 124 or 125 in the axial direction. Inner rotor 102 and outer rotor 103 have different numbers of N–S pole pairs, by changing arrangement of magnetic poles. In this example, the number of permanent magnets is equal between inner rotor 102 and outer rotor 103; and each of inner rotor 102 and outer rotor 103 includes twelve magnets. In inner rotor 102, two of the magnets are paired to form one pole, so that there are three pole pairs. In outer rotor 103, the magnets are arranged individually so that one pole is formed by each magnet, and there are six pole pairs.

In housing 104, outer rotor 103 is drivingly connected with a torque transmission shell 105 around laminated core 125. Torque transmission shell 105 is supported rotatably in housing 104 by bearings 107 and 108 at both ends respectively, and connected with an outer rotor shaft 109 near bearing 107.

Inner rotor 102 includes a hollow inner rotor shaft 110 extending through laminated core 124. An outer rotor shaft 109 is rotatable inside hollow inner rotor shaft 110. Laminated core 124 of inner rotor 102 is drivingly connected with inner rotor shaft 110. An intermediate portion of inner rotor shaft 110 is supported rotatably in a fixed stator bracket 113 by a bearing 112. One end of inner rotor shaft 110 (left end in FIG. 1) is supported rotatably on a corresponding wall end of torque transmission shell 105 by a bearing 114.

Stator 101 includes a plurality of stator pieces of magnetic steel sheets formed into T-shape by press forming, and laminated in the axial direction of stator 101. As shown in FIG. 2, each stator piece is provided with an electromagnetic coil 117 wound on a tooth portion between a yoke of inner rotor 102 and a yoke of outer rotor 103. The stator pieces provided with coils are arranged in a circle at regular intervals, to form a stator core. The stator core is clamped axially between brackets 113 and 118 on both sides of the axial length of stator 101, by bolts 119, and formed into an integral form of stator 101 by molding with resin 120. A plurality of coolant passages 141 are formed in the resin 120. Each coolant passage 141 extends axially between adjacent two of the stator pieces in resin 120. Bolts 119 are located both on the radial outer side and radial inner side of coolant passages 141, and tightened with nuts 119*a*, respectively. A fastening structure of rivet pins can be employed instead of the structure of bolts 119 and nuts 119*a*.

A rotation sensor 148 and a rotation sensor 147 sense rotation positions of inner rotor 102 and outer rotor 103, respectively. Electromagnetic coils 117 in stator 101 are supplied with a compound current formed by superposing drive currents of different phases according to rotation positions of permanent magnets. With the compound current, this motor generates rotating magnetic fields in stator 101 for inner rotor 102 and outer rotor 103, and thereby drives inner rotor 102 and outer rotor 103 at respective different speeds in synchronism with the respective rotating magnetic fields.

Figure 3:
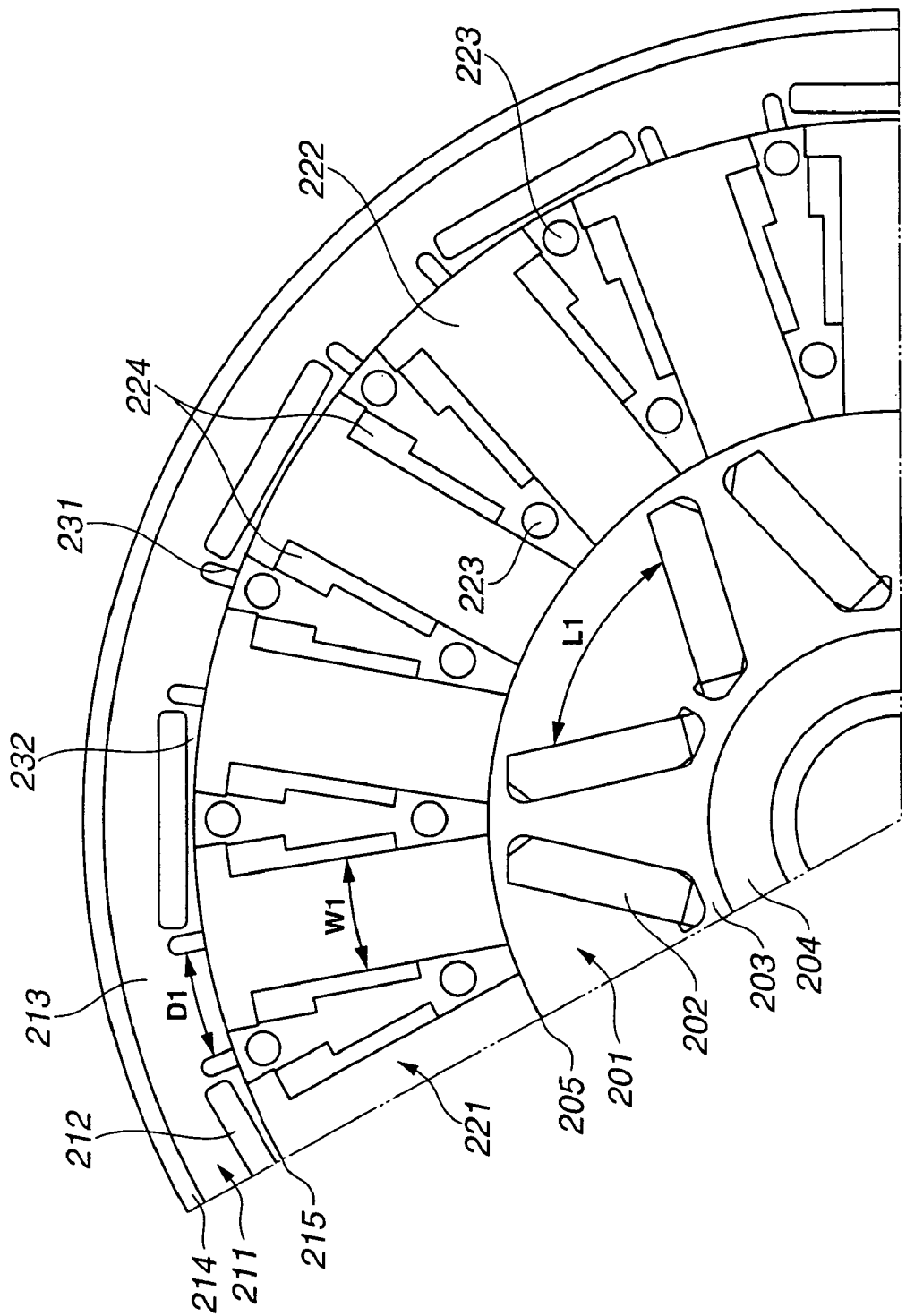
FIG. 3 is a cross sectional view showing a magnetic circuit structure for the rotary electric machine according to the first embodiment of the present invention.

FIG. 3 shows the magnetic circuit structure for a rotary electric machine according to the first embodiment of the present invention more in detail. The rotary electric machine, as shown in FIG. 3, includes an inner rotor 201, an outer rotor 211, and a stator 221. Inner rotor 201 includes a plurality of inner permanent magnets 202, an annular inner electromagnetic member 203, and a shaft 204. An inner stator air gap 205 is formed between inner rotor 201 and stator 221. Outer rotor 211 includes a plurality of outer permanent magnets 212, an annular outer electromagnetic member 213, and an outer shell 214. An outer stator air gap 215 is formed between outer rotor 211 and stator 221. Stator 221 includes stator teeth 222, stator supporting members 223, and stator (armature) coils 224 wound on the respective stator teeth 222. In this embodiment, air layers 231 are formed at both ends of each outer permanent magnet 212, and air layers 231 extend radially to outer stator air gap 215. Each outer permanent magnet 212 is separated from outer air gap 215 by an inner circumferential layer of magnetic material 232 extending radially between that outer permanent magnet 212 and outer air gap 215, circumferentially from the air layer 231 on one side of that outer permanent magnet 212 to the air layer 231 on the opposite side of that outer permanent magnet 212.

In this rotary electric machine according to the first embodiment, inner permanent magnets 202 are arranged circumferentially at a predetermined angle with respect to a radial direction. Inner permanent magnets 202 are inclined alternately so that inner magnets 202 form a zigzag form around the center axis and that narrower portions and wider portions are arranged alternately in the outer circumference surface region of the inner annular member 203. Each wider portion is made wider than that of earlier technology. Moreover, a circumferential separation between two adjacent outer permanent magnets 202 is longer than that of earlier technology. Air layers 231 are formed at the sides of both ends of each outer permanent magnet 202. In this arrangement, the arrangement of inner permanent magnets 202 and the arrangement of outer permanent magnets 212 can act to reduce magnetic reluctance in an inner (first) magnetic circuit and an outer (second) magnetic circuit. Air layers 231 can act to decrease flux leakage of outer permanent magnets 212, and to increase outer magnetic flux without decreasing inner magnetic flux.

As shown in FIG. 3, the inner (first) magnetic circuit is arranged so that a circumferential distance D1 between two adjacent outer permanent magnets 212 is substantially equal to or longer than the shortest circumferential length W1 of stator teeth 222. The outer (second) magnetic circuit is arranged so that a circumferential length L1 of the wider portions each formed in the outer surface layer of inner rotor 201, between two adjacent inner permanent magnets 202 is substantially equal to or greater than a double (=D1×2) which is 2 times the circumferential distance D1. (In this example, circumferential distance D1 is substantially equal to circumferential length W1 (D1≈W1).) In FIG. 3, circumferential distance D1 is measured between adjacent two air layers 231, as shown in the figure, as a circumferential width of inner portions of outer electromagnetic member 213 each of which is formed between two adjacent outer permanent magnets 212.

Figure 4:
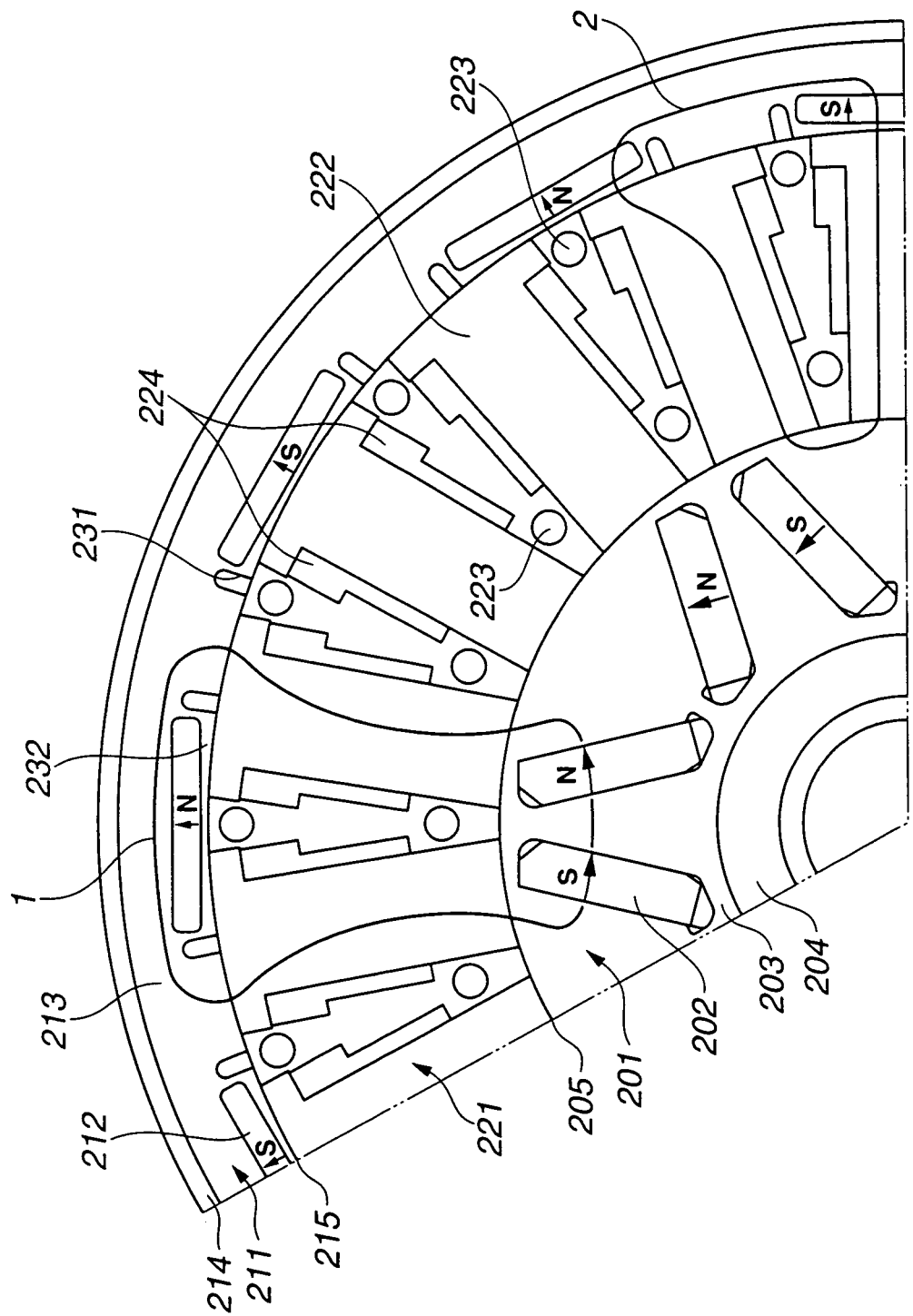
FIG. 4 is an explanatory view illustrating the magnetic circuit structure for the rotary electric machine of FIG. 3.

FIG. 4 shows paths of magnetic flux in the magnetic circuit structure shown in FIG. 3. In this example, magnetic flux 1 is flux synchronized with inner rotor 201. Magnetic flux 1 shown in FIG. 4 flows from one inner permanent magnets 202 forming an N pole among inner permanent magnets 202 forming the N pole and the S pole. Magnetic flux 1 further flows through a portion between two adjacent outer permanent magnets 212, an outer portion on the outer side of one outer permanent magnet 212, to the next inner permanent magnet 202 forming the S pole. The inner (or first) magnetic circuit for magnetic flux 1 is formed by utilizing, as a yoke portion of the inner magnet circuit, the outer portions of outer rotor 211 each located on the radial outer side of one of outer permanent magnets 202. The inner (first) magnetic circuit shown as path of magnetic flux 1 is further used as a quadrature axis (q-axis) magnetic circuit of outer rotor 211. Since the separation between two adjacent outer permanent magnets 212 is wide, the q-axis magnetic reluctance is small, and the magnetic circuit structure can produce sufficient reluctance torque.

Magnetic flux 2 shown in FIG. 4 is flux synchronized with outer rotor 211. Magnetic flux 2 flows from an N-pole formed by one of the outer permanent magnets 212. Magnetic flux 2 further flows through one wider portion of the outer surface layer of inner rotor 201 between two adjacent inner permanent magnets 202, and returns to an S-pole formed by the next outer permanent magnet 212. The outer (second) magnetic circuit for magnetic flux 2 is formed by utilizing, as a yoke portion of the outer magnetic circuit, the outer surface layer of inner rotor 201. The outer (second) magnetic circuit shown as a path of magnetic flux 2 is used further as a q-axis magnetic circuit for magnetic flux synchronous with inner rotor 201. Since the wider portion in the outer circumference surface layer of inner rotor 201 between two adjacent inner permanent magnets 202 is wide, the q-axis magnetic reluctance is small, and the magnetic circuit structure can produce sufficient reluctance torque.

In the magnetic circuit structure of the rotary electric machine according to this embodiment, as mentioned above, the inner and outer rotors are so arranged to decrease the q-axis magnetic reluctance. Moreover, each of the inner and outer rotors acts, for the other rotor, as the yoke for conducting magnetic flux synchronous with the other rotor (that is, magnetic flux generated by permanent magnets and magnetic flux generated by stator coils). Therefore, this structure can increase the magnetic flux, reluctance torque and torque density. Incidentally, FIG. 4 shows each of magnetic flux 1 and magnetic flux 2 in an instantaneous state at a specific instant.

Figure 5:
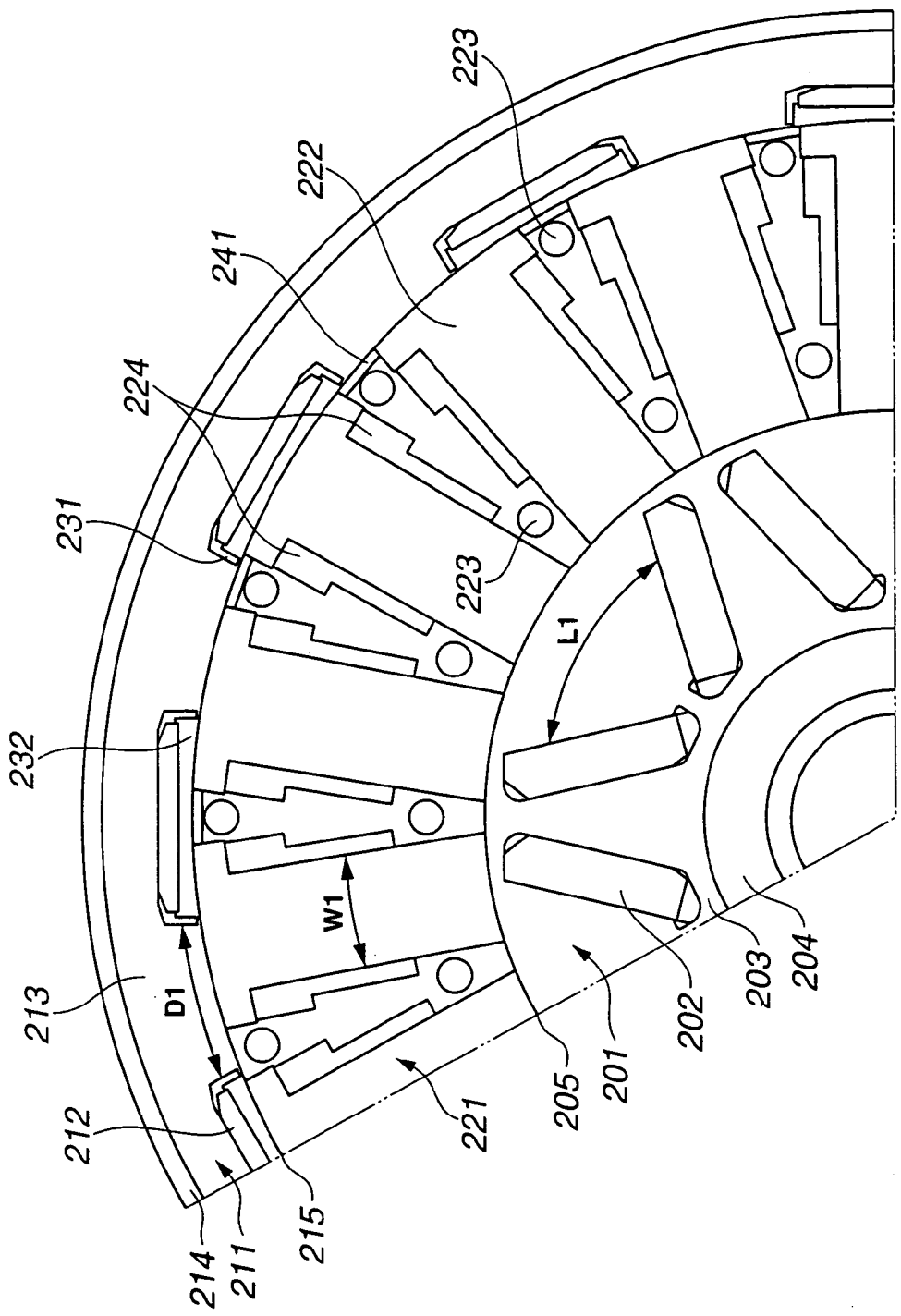
FIG. 5 is a cross sectional view showing a magnetic circuit structure for the rotary electric machine according to a second embodiment of the present invention.

FIG. 5 shows a magnetic circuit structure for a rotary electric machine according to a second embodiment of the present invention. The magnetic circuit structure of FIG. 5 is substantially identical to the structure of FIG. 3 in most aspects as shown by the use of the same reference numerals. In this second embodiment, unlike the first embodiment, stator 221 includes a plurality of electromagnetic bridge portions 241 each connecting two adjacent stator teeth 222 so as to form a path of magnetic flux therebetween. Each bridge portion 241 extends circumferentially between two adjacent stator teeth 222 alongside the outer air gap 215, and thereby connects these two adjacent stator teeth 222. Each bridge portion 241 has an outer surface exposed to outer air gap 215 between outer rotor 211 and stator 221. Each bridge portion 241 of this example is made of magnetic steel sheet. In the example of FIG. 5, each air layer 231 does not reach outer air gap 215, but terminates at an inner end separated from outer air gap 215 by the inner circumference portion of outer annular electromagnetic member 213.

In the magnetic circuit structure of FIG. 5, inner magnetic flux is conducted through an outside circumference surface portion of stator 221 as well as the outer portion on the outer side of each outer permanent magnet 212, so that the inner (first) magnetic circuit is formed also in the outer circumferential surface of stator 221. Therefore, this structure can reduce magnetic reluctance of the yoke portion in the inner magnetic circuit, and improve the inner magnetic flux significantly. As the yoke portion is formed in fixed stator 221 not rotatable unlike outer rotor 211, the structure of such a fixed yoke portion can eliminate influence of relative rotation and reduce iron loss.

Figure 6:
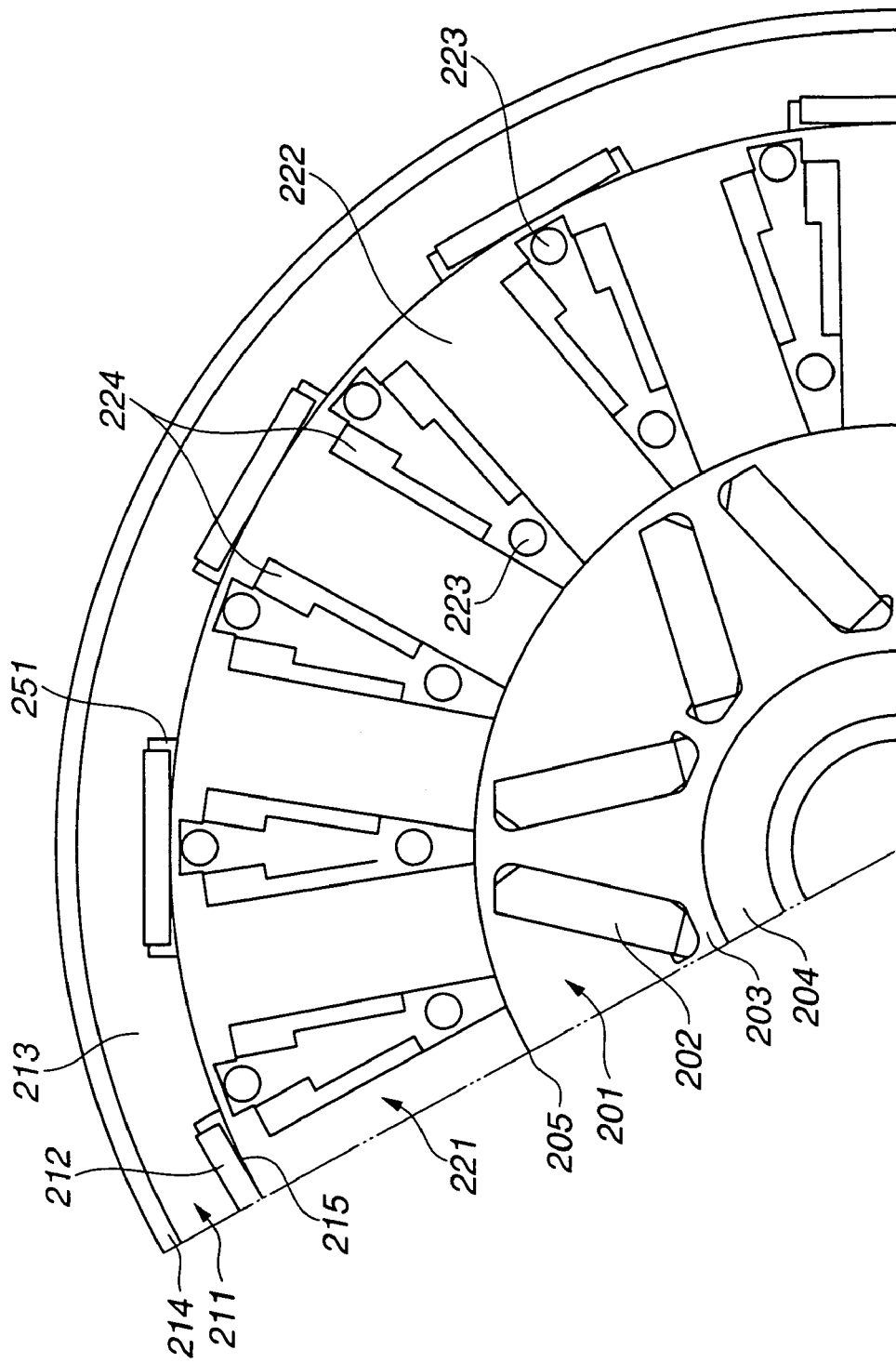
FIG. 6 is a cross sectional view showing a magnetic circuit structure for the rotary electric machine according to a third embodiment of the present invention.

FIG. 6 shows a magnetic circuit structure for a rotary electric machine according to a third embodiment of the present invention. The magnetic circuit structure of FIG. 6 is substantially identical to the structure of FIG. 3 in most aspects as shown by the use of the same reference numerals. In this third embodiment, an air layer 251 extends circumferentially on the radial inner side of each outer permanent magnet 212, from one side of that permanent magnet 212 to the other side, and each outer permanent magnet 212 is exposed to the outer air gap 215. Air layer 251 is formed on the radial inner side and both circumferential sides of each outer permanent magnet 212.

The thus-constructed magnetic circuit structure having the exposed outer permanent magnets 212 can reduce the magnetic reluctance of the yoke portion in the outer portions on the outer side of outer permanent magnets 212 significantly beyond the level of the example shown in FIG. 5, and thereby improve the inner magnetic flux in the inner magnetic circuit significantly. As outer permanent magnets 212 are exposed to stator 221, the magnetic flux from outer permanent magnets 212 is conducted directly to stator 221, without passing through outer electromagnetic member 213. Thereby, the magnetic circuit can reduce magnetic reluctance in surfaces of outer permanent magnets 212, and increase the outer magnetic flux, like the inner magnetic flux.

Figure 7:
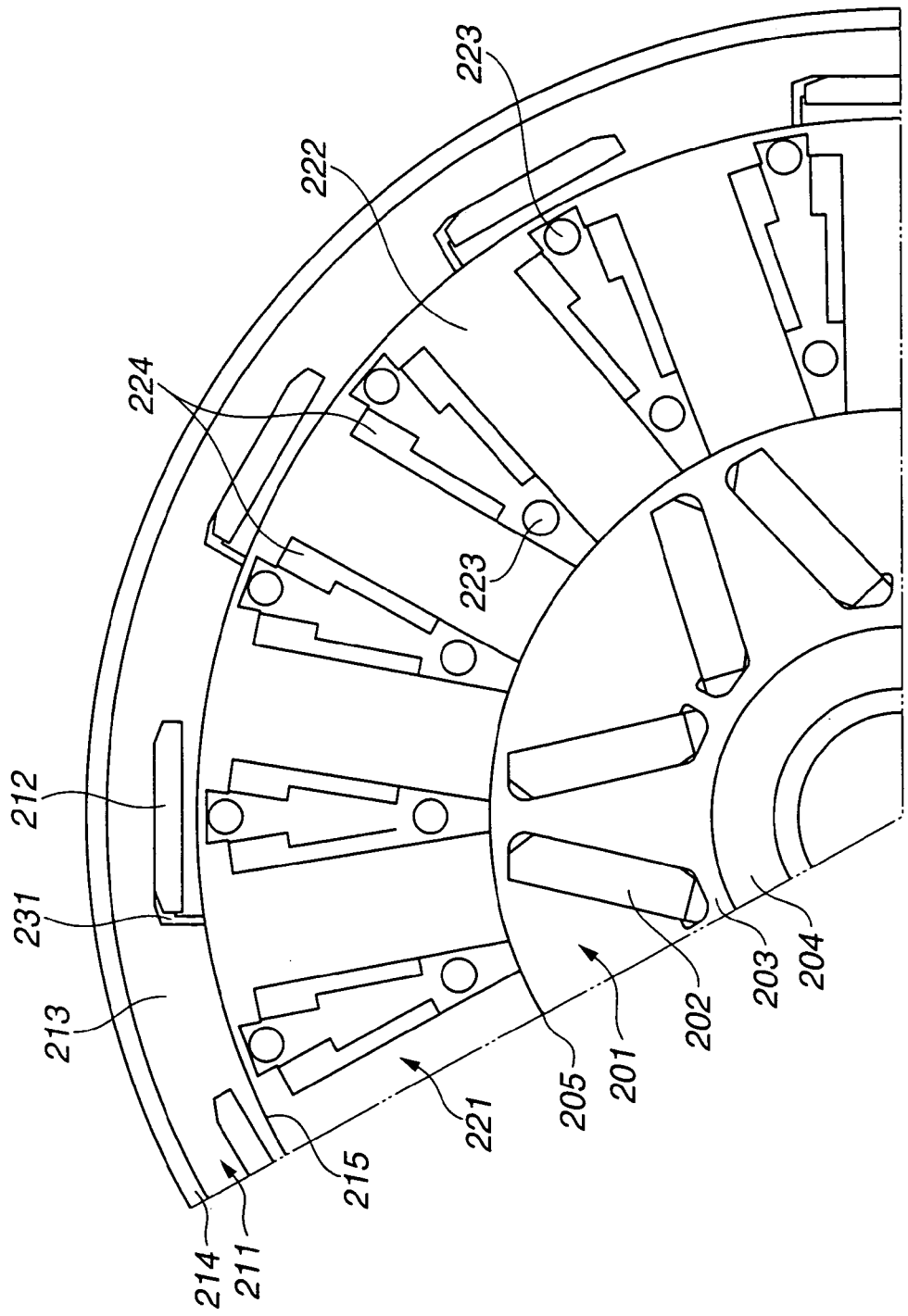
FIG. 7 is a cross sectional view showing a magnetic circuit structure for the rotary electric machine according to a fourth embodiment of the present invention.

FIG. 7 shows a magnetic circuit structure for a rotary electric machine according to a forth embodiment of the present invention. The magnetic circuit structure of FIG. 7 is substantially identical to the structure of FIG. 3 in most aspects as shown by the use of the same reference numerals. In the example shown in FIG. 7, an air layer 231 is formed only on one circumferential side of each outer permanent magnet 212. Each outer permanent magnet 212 includes a first circumferential end exposed in the adjacent air layer 231, and a second circumferential end embedded and enclosed in annular electromagnetic member 213.

In this example, as shown in FIG. 8, each outer permanent magnet 212 is sided with one air layer 231 on one circumferential side and another air layer 231 on the outer circumferential side, and these two air layers of each other permanent magnet 212 are shifted axially so as not to overlap each other. In the example shown in FIG. 8 as viewed from the radial inner side, each of the outer permanent magnets 212 extends axially, in a longitudinal direction of the outer permanent magnet 212, and includes first and second axial portions each extending circumferentially, in a widthwise direction of the outer permanent magnet, from a first circumferential end to a second circumferential end. The first and second axial portions of each outer permanent magnet 212 are accompanied, respectively, by two of the air layers 231 on opposite sides so that the first circumferential end of the first axial portion is bordered by one of the air layers while the second circumferential end of the first axial portion is boarded by none of the air layers, and that the second circumferential end of the second axial portion is bordered by one of the air layers while the first circumferential end of the second axial portion is boarded by none of the air layers. In this alternating arrangement, it is possible to form air layers 231 in outer electromagnetic member 213 easily by production method as described later, without requiring additional members for forming the inner circumference portions 232, and without decreasing the mechanical strength.

Figure 9A:
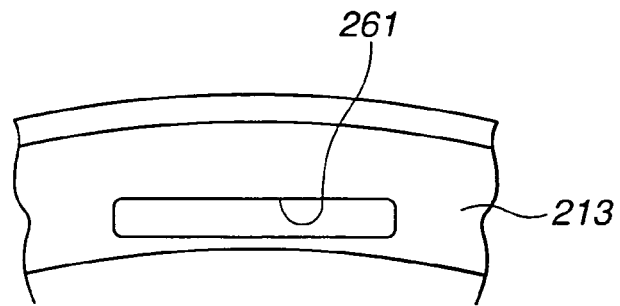
FIGS. 9A, 9B and 9C are views showing a production method of air layers 231 of the magnetic circuit structure, which can be employed in the present invention.
Figure 9B:
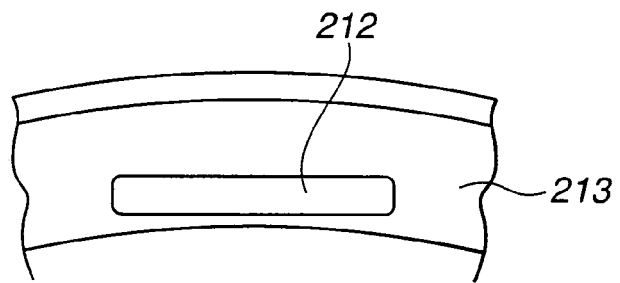
Figure 9C:
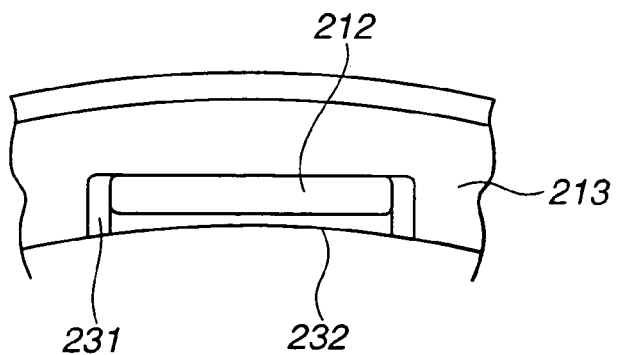

FIGS. 9A, 9B and 9C show one example of a production method of forming air layers 231. Firstly, as shown in FIG. 9A, outer electromagnetic member 213 is formed by laminating magnetic steel sheets each of which is prepared, by press forming, to have a plurality of holes 261 for receiving outer permanent magnets 212. Secondly, as shown in FIG. 9B, one outer permanent magnet 212 is inserted and fixed in each of holes 261 by bonding. Thirdly, as shown FIG. 9C, air layers 231 are formed by cutting from the inner circumference of outer electromagnetic member 213 so that at least one air layer 231 is formed at the side of each outer permanent magnet 212. In this production method, air layers 231 can be formed by cutting at the third step of FIG. 9C after the second step (FIG. 9B) of forming the annular laminated member 213 including therein outer permanent magnets 212. In this production method, it is possible to form inner circumference portions 232 on the radial inner side of outer permanent magnets 212 accurately and firmly as compared to a method of forming inner circumference portions 232 with another material or as another member. In the production method shown in FIGS. 9A, 9B and 9C, each cutout to form one air layer extends in the axial direction of the outer rotor, that is, the thickness direction of the rotor lamination, and the length of each cutout is shorter than the thickness of the lamination.

The magnetic circuit structure according to the present invention is applicable to various rotary electric machines having a multi-layer structure of at least one stator and at least inner and outer rotors especially when there is need for reducing the magnetic reluctance in yoke portions, and for increasing the torque by increasing the magnetic flux without increasing the quantity of magnet.

This application is based on a prior Japanese Patent Application No. 2003-352629. The entire contents of the Japanese Patent Application No. 2003-352629 with a filing date of Oct. 10, 2003 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A rotary electric machine comprising:
 a stator including a plurality of stator coils arranged around a center axis of the rotary electric machine;
 an inner rotor disposed rotatably inside the stator, the inner rotor including a plurality of inner permanent magnets arranged around the center axis and inclined alternately, and a plurality of outer surface portions serving as a yoke portion of an outer magnetic circuit; and
 an outer rotor disposed rotatably outside the stator, the outer rotor including a plurality of outer permanent magnets arranged in a circle, and a plurality of outer portions each located on an outer side of each of the outer permanent magnets, and arranged to serve as a yoke portion of an inner magnetic circuit for magnetic flux synchronous with the inner rotor whereas each outer surface portion of the inner rotor is arranged to serve as the yoke portion of the outer magnetic circuit for magnetic flux synchronous with the outer rotor, the inner magnetic circuit being arranged to serve further as a quadrature axis magnetic circuit of the outer rotor, and the outer magnetic circuit being arranged to serve further as a quadrature axis magnetic circuit of the inner rotor;

wherein the stator includes a plurality of stator teeth; the outer permanent magnets are arranged circumferentially so that a circumferential distance between adjacent two of the outer permanent magnets is greater than or substantially equal to a minimum circumferential width of the stator teeth; and the inner permanent magnets are inclined alternately so that wider regions and narrower regions are formed alternately in an outer circumference of the inner rotor by the inner permanent magnets, and a circumferential length of the wider regions of the outer circumference of the inner rotor is greater than or equal to a double of the circumferential distance among the outer permanent magnets.

2. The rotary electric machine as claimed in claim 1, wherein the outer rotor is formed with air layers so that at least one air layer extends axially at a side of the outer permanent magnets.

3. The rotary electric machine as claimed in claim 2, wherein an air layer extends axially at each side of the permanent magnets.

4. The rotary electric machine as claimed in claim 3, wherein each of the air layers extends radially to an outer air gap between the outer rotor and the stator, and each of the outer permanent magnets is separated radially from the air gap by a circumferential layer of magnetic material extending circumferentially between the outer permanent magnet and the outer air gap.

5. The rotary electric machine as claimed in claim 3, wherein each of the outer permanent magnets extends axially and includes first and second axial portions each extending circumferentially from a first circumferential end to a second circumferential end, and the first and second axial portions of each outer permanent magnet are accompanied, respectively, by two of the air layers on opposite sides so that the first circumferential end of the first axial portion is bordered by one of the air layers while the second circumferential end of the first axial portion is boarded by none of the air layers, and that the second circumferential end of the second axial portion is bordered by one of the air layers while the first circumferential end of the second axial portion is bordered by none of the air layers.

6. The rotary electric machine as claimed in claim 3, wherein the stator includes a plurality of bridge portions of magnetic material each extending between adjacent two of the stator teeth alongside the air gap between the outer rotor and the stator, and thereby connecting the adjacent two of the stator teeth.

7. The rotary electric machine as claimed in claim 3, wherein each of the outer permanent magnets is bared in the air gap between the outer rotor and the stator.

8. The rotary electric machine as claimed in claim 3, wherein the outer rotor further includes a laminate of magnetic sheets and the laminate is formed with a plurality of cutouts each forming one of the air layers.

9. The rotary electric machine as claimed in claim 2, wherein the stator includes a plurality of bridge portions of magnetic material each extending between adjacent two of the stator teeth alongside the air gap between the outer rotor and the stator, and thereby connecting the adjacent two of the stator teeth.

10. The rotary electric machine as claimed in claim 2, wherein each of the outer permanent magnets is bared in the air gap between the outer rotor and the stator.

11. The rotary electric machine as claimed in claim 2, wherein the outer rotor further includes a laminate of magnetic sheets and the laminate is formed with a plurality of cutouts each forming one of the air layers.

12. The rotary electric machine as claimed in claim 2, wherein the outer rotor is formed with a plurality of air layers so that so that the air layers are formed only on one circumferential side of each of the outer permanent magnets so that one circumferential end of the outer permanent magnet is exposed in an air layer.

13. The rotary electric machine as claimed in claim 12, wherein each of the air layers extends radially to an outer air gap between the outer rotor and the stator.

14. A rotary electric machine comprising:
a stator including a plurality of stator teeth and a plurality of stator coils;
an outer rotor disposed rotatably outside the stator, the outer rotor including an outer annular member, and a plurality of outer permanent magnets arranged in the outer annular member so that inner portions are formed in the outer annular member and that the inner portions of the outer annular member and the outer permanent magnets are arranged alternately in a circle, a circumferential length of the inner portions of the outer annular member being greater than or substantially equal to a minimum circumferential width of the stator teeth; and
an inner rotor disposed rotatably inside the stator, the inner rotor including an inner annular member, and a plurality of inner permanent magnets arranged in a circle in the inner annular member, and inclined alternately so that wider portions and narrower portions are formed alternately in an outer circumference of the inner annular member by the inner permanent magnets, a circumferential length of the wider portions of the outer circumference of the inner annular member being greater than or substantially equal to a double of the circumferential length of the inner portions of the outer annular member.

* * * * *